(12) United States Patent
Kong

(10) Patent No.: US 11,370,486 B2
(45) Date of Patent: Jun. 28, 2022

(54) NOISE REDUCTION APPARATUS FOR ELECTRIC POWER STEERING SYSTEM

(71) Applicants: HYUNDAI MOTOR COMPANY, Seoul (KR); KIA MOTORS CORPORATION, Seoul (KR)

(72) Inventor: Do-Hyun Kong, Gwangmyeong-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 358 days.

(21) Appl. No.: 16/668,673

(22) Filed: Oct. 30, 2019

(65) Prior Publication Data

US 2020/0255063 A1  Aug. 13, 2020

(30) Foreign Application Priority Data

Feb. 12, 2019 (KR) .................. 10-2019-0016166

(51) Int. Cl.
*B62D 7/22* (2006.01)
*B62D 5/04* (2006.01)
*B62D 3/04* (2006.01)
*F16H 55/24* (2006.01)
*F16H 57/021* (2012.01)

(52) U.S. Cl.
CPC .............. *B62D 7/226* (2013.01); *B62D 3/04* (2013.01); *B62D 5/0421* (2013.01); *F16H 55/24* (2013.01); *B60Y 2306/09* (2013.01); *F16C 2326/24* (2013.01); *F16H 2057/0213* (2013.01)

(58) Field of Classification Search
CPC . B62D 7/22; B62D 7/226; B62D 3/04; B62D 5/0421; F16H 55/24; F16F 15/10; F16F 15/12; F16F 15/1207; F16F 15/121
See application file for complete search history.

(56) References Cited

U.S. PATENT DOCUMENTS

| 10,053,140 B2* | 8/2018 | Park ..................... B62D 5/0403 |
| 2007/0125193 A1* | 6/2007 | Augustine ............. F16F 15/022 74/416 |
| 2008/0041178 A1* | 2/2008 | Ozsoylu .................. F16H 55/24 74/425 |

(Continued)

FOREIGN PATENT DOCUMENTS

| JP | 2002249056 A | 9/2002 |
| KR | 10-1509798 B | 4/2015 |

*Primary Examiner* — Minnah L Seoh
*Assistant Examiner* — Conan D Duda
(74) *Attorney, Agent, or Firm* — Lempia Summerfield Katz LLC

(57) ABSTRACT

A noise reduction apparatus for an electric power steering system may include a worm wheel rotatably and integrally coupled to a steering shaft connected to a steering wheel; a worm gear shaft to be rotatably operated by rotational force of an electric motor and formed with a worm gear to be meshed with the worm wheel; a tilt bearing provided between the worm gear shaft and the electric motor to rotatably support one end of the worm gear shaft; a support bearing for rotatably supporting the other end of the worm gear shaft; a plurality of pressing pins for pressing the support bearing; and a plurality of elastic members for elastically supporting the plurality of pressing pins respectively.

5 Claims, 3 Drawing Sheets

(56) References Cited

U.S. PATENT DOCUMENTS

| | | | | |
|---|---|---|---|---|
| 2009/0314114 A1* | 12/2009 | Grasberg | ............... | F16H 55/24 |
| | | | | 74/409 |
| 2011/0127742 A1* | 6/2011 | Bae | ............ | B62D 7/226 |
| | | | | 280/93.513 |
| 2013/0126260 A1* | 5/2013 | Kim | ............ | F16H 55/24 |
| | | | | 180/444 |
| 2014/0020973 A1* | 1/2014 | Galehr | ............ | B62D 5/0409 |
| | | | | 180/444 |
| 2014/0174843 A1* | 6/2014 | Kimoto | ............ | F16H 55/24 |
| | | | | 180/444 |
| 2014/0352467 A1* | 12/2014 | Kwon | ............ | B62D 5/0409 |
| | | | | 74/400 |
| 2015/0059506 A1* | 3/2015 | Kwon | ............ | F16C 25/06 |
| | | | | 74/425 |
| 2015/0107384 A1* | 4/2015 | Kwon | ............ | B62D 5/0409 |
| | | | | 74/89.14 |
| 2016/0068184 A1* | 3/2016 | Kimoto | ............ | B62D 7/226 |
| | | | | 180/444 |
| 2016/0121921 A1* | 5/2016 | Schönlechner | ...... | B62D 5/0403 |
| | | | | 180/444 |
| 2016/0201760 A1* | 7/2016 | Kwon | ............ | F16H 55/24 |
| | | | | 74/409 |
| 2016/0221600 A1* | 8/2016 | Lee | ............ | B62D 5/0421 |
| 2017/0183026 A1* | 6/2017 | Lee | ............ | F16C 25/083 |
| 2018/0073627 A1* | 3/2018 | Gibbs | ............ | F16H 1/16 |
| 2019/0353238 A1* | 11/2019 | Kim | ............ | F16C 35/067 |
| 2021/0003202 A1* | 1/2021 | Eitelbuss | ............ | F16H 57/12 |
| 2022/0018390 A1* | 1/2022 | Gebhardt | ............ | F16C 19/06 |

* cited by examiner

FIG. 1 "PRIOR ART"
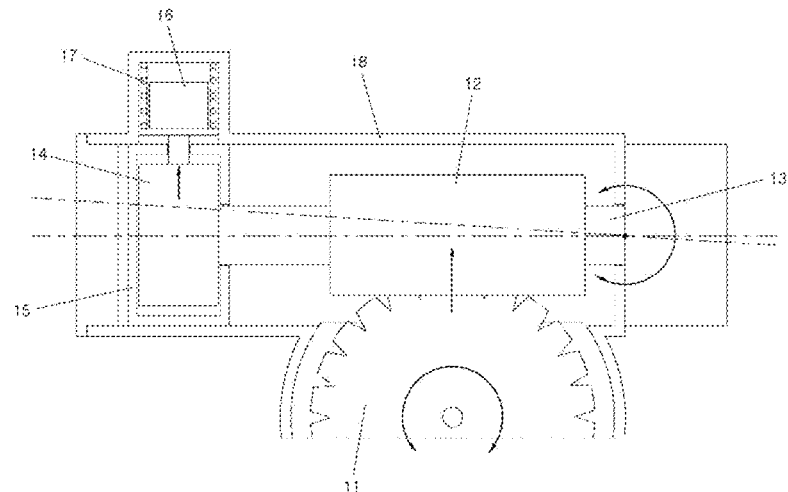
FIG. 2 "PRIOR ART"
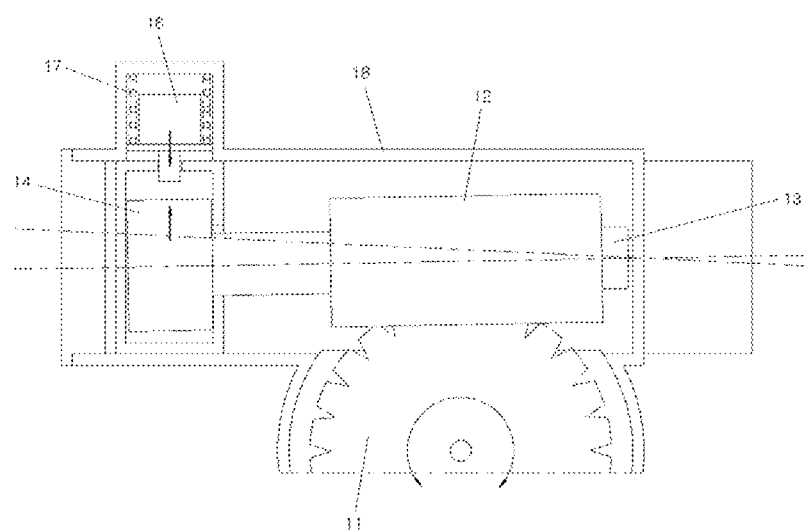

NOISE REDUCTION APPARATUS FOR ELECTRIC POWER STEERING SYSTEM

CROSS-REFERENCE TO RELATED APPLICATION

This application claims priority to and the benefit of Korean Patent Application No. 10-2019-0016166, filed on Feb. 12, 2019, the disclosure of which is incorporated herein by reference in its entirety.

FIELD

The present disclosure relates to an electric power steering system.

BACKGROUND

The statements in this section merely provide background information related to the present disclosure and may not constitute prior art.

FIG. 1 partially shows an example of an electric power steering system and a noise reduction apparatus therefor. The power steering system may include a worm wheel coupled to a steering shaft connected to a steering wheel and a worm gear shaft 12 having a worm gear to be meshed with the worm wheel 11.

Further, the power steering system may include a tilt bearing 13 supporting one end of the worm gear shaft 12 between the worm gear shaft 12 and an electric motor and allowing the worm gear shaft 12 to turn toward the worm wheel 11; a support bearing 14 supporting the other end of the worm gear shaft 12; and an elliptical ring 15 having an inner diameter portion to accommodate movement of the support bearing 14 when the support bearing turns toward the worm wheel 11 of the worm gear shaft 12 wherein these components are provided in a housing 18.

In such an electric power steering apparatus, if the meshed state between the worm gear and the worm wheel 11 is not maintained stably, rattle noise is generated because gears bump against each other between the worm gear and the worm wheel 11 due to load input reversely through the steering shaft.

A noise reduction apparatus as shown in FIG. 1 includes a pressing pin 16 for pressing the support bearing 14 and an elastic spring 17 for elastically supporting the pressing pin 16. In other words, the pressing pin 16 presses the support bearing 14 at the time when rotational force of the worm wheel 11 generated by load applied by the steering shaft lifts the worm gear shaft 12 pivotally about the tilt bearing 13, thereby reducing movement behavior of the worm gear shaft 12 and thus reducing occurrence of rattle noise.

As shown in FIG. 2, we have discovered that the pressing load of the pressing pin 16 pressing the support bearing 14 is reduced by various factors while the electric power steering system is operated for a long time. Such factors include: a clearance between the worm wheel 11 and the worm gear shaft 12, which is caused due to abrasion of the worm wheel 11 resulting from continuous friction between the worm wheel and the worm gear shaft; and increase of a distance that the elastic spring 17 supports the worm gear shaft 12, which is caused because the worm gear shaft is tilted downward. In addition, we have also found that deterioration of the elastic spring 17 may also be included in the factors.

Ultimately, if such a situation occurs, the noise reduction apparatus may not function appropriately when large impact is imparted by the worm wheel 11.

The above information disclosed in this Background section is only for assisting understanding of the background of the disclosure and it may therefore contain information that does not form the prior art that is already known to those who have ordinary skill in the art.

SUMMARY

The present disclosure provides a noise reduction apparatus for an electric power steering system that can continue to have noise reduction performance even after aging of the electric power steering system.

In accordance with one aspect of the present disclosure, there may be provided a noise reduction apparatus for an electric power steering system, including: a worm wheel rotatably and integrally coupled to a steering shaft connected to a steering wheel; a worm gear shaft configured to be rotatably operated by rotational force of an electric motor and formed with a worm gear to be meshed with the worm wheel; a tilt bearing provided between the worm gear shaft and the electric motor configured to rotatably support one end of the worm gear shaft; a support bearing for rotatably supporting the other end of the worm gear shaft; a plurality of pressing pins for pressing the support bearing; and a plurality of elastic members for elastically supporting the plurality of pressing pins respectively.

Further, the plurality of pressing pins may include a first pressing pin and a second pressing pin wherein directions in which the first pressing pin and the second pressing pin press the support bearing are opposite to each other.

Further, the support bearing may be provided in a cylindrical shape wherein the noise reduction apparatus may further include an elliptical ring for accommodating the support bearing, the support bearing being actuated to ascend or descend in the elliptical ring.

In this case, the first pressing pin may be configured to penetrate the elliptical ring to press the top face of the support bearing and the second pressing pin may be configured to penetrate the elliptical ring to press the bottom face of the support bearing.

Further, the noise reduction apparatus may further include a housing in which the worm gear shaft, the elliptical ring, the first pressing pin and the second pressing pin are accommodated wherein one ends of first and second elastic members may be coupled to the inner surface of the housing and the other ends of the first and second elastic members may be coupled to the first and second pressing pins respectively.

On the other hand, the first elastic member supporting the first pressing pin and the second elastic member supporting the second pressing pin may have a predetermined deterioration degree relationship with each other.

It is to be understood that both the foregoing general description and the following detailed description of the present disclosure are exemplary and explanatory and are intended to provide further explanation of the disclosure as claimed.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 1 is a schematic diagram of a noise reduction apparatus for an electric power steering system;

FIG. 2 is a diagram for showing consequences of aging of the electric power steering system of FIG. 1;

Figure 3:
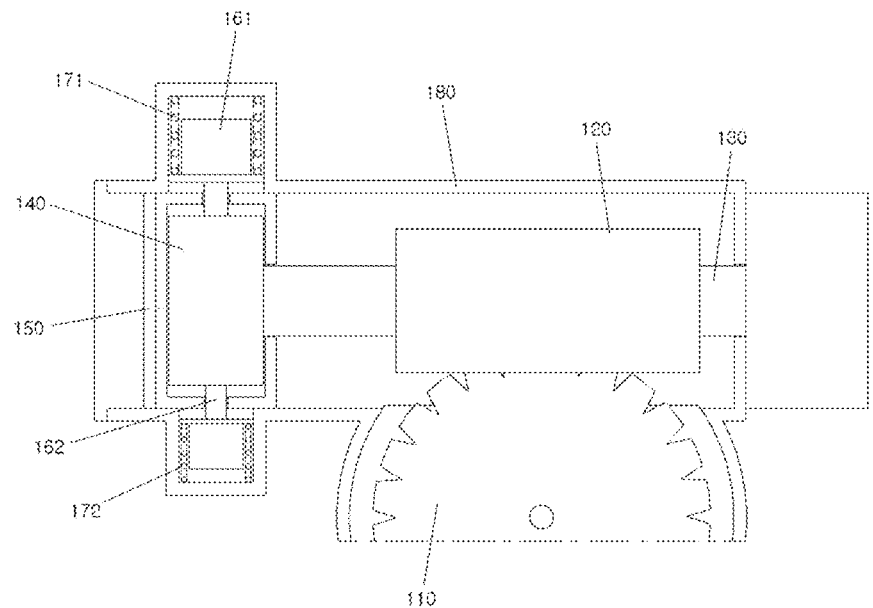
FIG. 3 is a schematic diagram of a noise reduction apparatus for an electric power steering system according to an aspect of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Detailed description of technology known in the art or iterative description may be made briefly, or may be omitted, to avoid obscuring the subject matter of the present disclosure.

Figure 4:
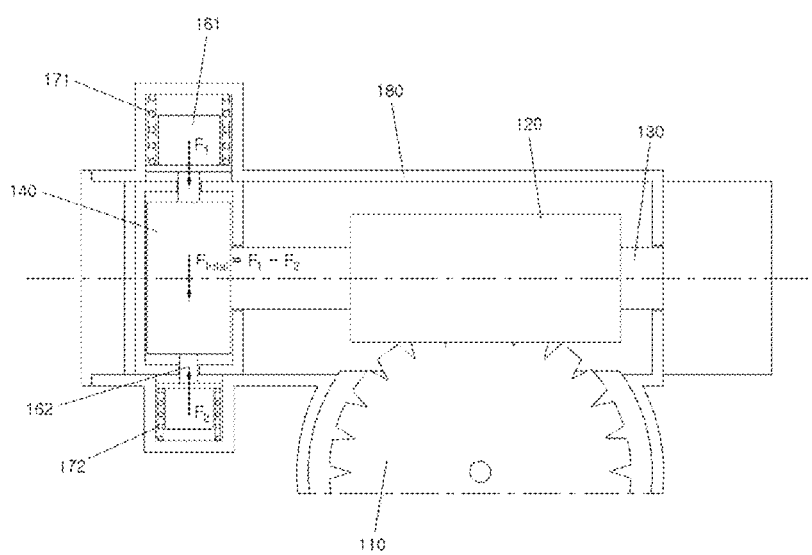
FIG. 4 is a diagram for showing dynamic relationship in a noise reduction apparatus according to an aspect of the present disclosure.
Figure 5:
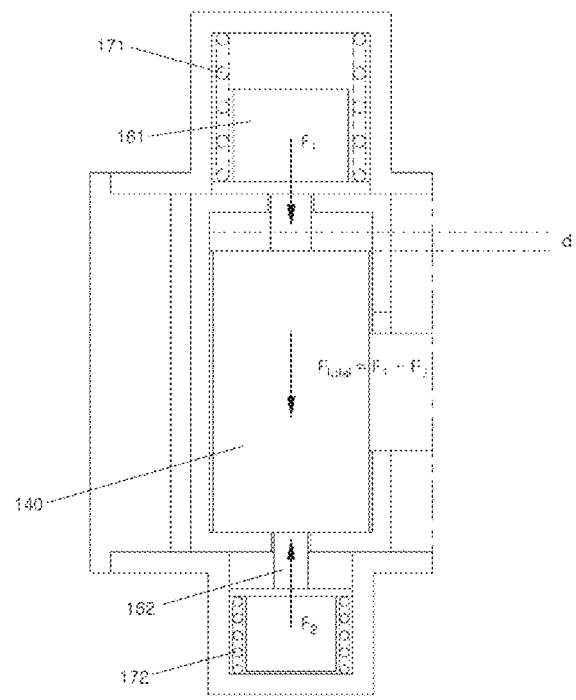
FIG. 5 is a diagram for showing compensation relationship of compensating a clearance after aging.

FIG. 3 is a schematic diagram of a noise reduction apparatus for an electric power steering system according to an aspect of the present disclosure, FIG. 4 is a diagram for showing dynamic relationship between two pressing pins in the noise reduction apparatus according to an aspect of the present disclosure, and FIG. 5 is a diagram for showing compensation relationship between two pressing pins compensating a clearance after aging.

Hereinafter, a noise reduction apparatus for an electric power steering system according to an aspect of the present disclosure will be described with reference to FIGS. 3 to 5.

The noise reduction apparatus for an electric power steering system according the aspect of the present disclosure may include a worm wheel 110, a worm gear shaft 120, a tilt bearing 130, a support bearing 140, an elliptical ring 150, a first pressing pin 161, a first elastic member 171, a second pressing pin 162, a second elastic member 172 and a housing 180.

The worm wheel 110 is rotatably and integrally coupled to a steering shaft connected to a steering wheel.

In addition, the worm gear shaft 120 is rotatably supported by both the tilt bearing 130 and the support bearing 140 and receives rotational force from the electric motor and is formed thereon with a worm gear to be meshed with the worm wheel 110.

The tilt bearing 130 supports one end of the worm gear shaft 120 between the worm gear shaft 120 and the electric motor and is configured to allow the worm gear shaft 120 to turn toward the worm wheel 110, while the support bearing 140 supports the other end of the worm gear shaft 120.

Further, the noise reduction apparatus may include an elliptical ring 150 having an inner diameter portion to accommodate movement of the support bearing 140 when the support bearing turns toward the worm wheel 110 of the worm gear shaft 120 wherein these components are provided in the housing 180.

In order to reduce rattle noise in the electric power steering system having such configuration, an aspect of the present disclosure may include a plurality of pressing pins for pressing the support bearing 140 and a plurality of elastic members for elastically supporting the plurality of pressing pins.

The elliptical ring 150 is installed in the housing 180 and the support bearing 140 is provided in the elliptical ring 150 and in turn the support bearing 140 is coupled to one end of the worm gear shaft 120.

The support bearing 140 has a cylindrical shape and is configured such that the top and bottom faces thereof can be pressed by the first pressing pin 161 and the second pressing pin 162, respectively.

To this end, the elliptical ring 150 is formed with two through holes for the pressing pins wherein the first pressing pin 161 and the second pressing pin 162 penetrate the through holes to support the support bearing 140, respectively.

The elastic members for elastically supporting the pressing pins 161 and 162 may be a first elastic spring 171 and a second elastic spring 172 as shown in the figures. The elastic springs 171 and 172 are coupled to the inner surface of the housing 180 at their one sides and to the first pressing pin 161 and the second pressing pin 162 at the other sides thereof, respectively so that they can exert elastic force to the first pressing pin 161 and the second pressing pin 162 and in turn to the support bearing 140.

Dynamic relationship in the noise reduction apparatus according to the aspect of the present disclosure is that pressing load of the worm gear shaft 120 pressing the worm wheel 110 becomes equal to a resultant force of $F_1$ exerted by the first pressing pin 161 and $F_2$ exerted by the second pressing pin 162, as shown in FIG. 4.

If no second pressing pin 162 according to an aspect of the present disclosure is provided, $F_{total}$ becomes equal to 15N when $F_1$ is 15N whereas $F_{total}$ becomes equal to 14N when $F_1$ becomes 14N due to a certain factor such as deterioration or the like.

However, in the case of the aspect of the present disclosure, when $F_1$ is 20N and $F_2$ is 5N, $F_{total}$ becomes equal to 15N, which is the same as the above case. If $F_1$ becomes 19N due to deterioration or the like of parts, $F_2$ becomes 4N and as a result, $F_{total}$ can be maintained at 15N.

Therefore, when load of each of the first pressing pin 161 and the second pressing pin 162 is set appropriately, load of the worm gear shaft 120 can be maintained regardless of aging.

FIG. 5 is for explaining this. FIG. 5 shows that the worm gear shaft 120 is tilted downward due to a clearance after aging.

If load of the first elastic spring 171 decreases due to deterioration or the like of parts themselves, $F_{total}$ is reduced.

However, if deterioration degree of the second elastic spring 172 is made higher than that of the first elastic spring 171, $F_{total}$ can be maintained even after aging.

In other words, when deterioration coefficients of the first elastic spring 171 and the second elastic spring 172 are denoted by α and β (where 0<β<α<1) respectively, change in a clearance due to abrasion is denoted by d and compression amount of the elastic spring is denoted by x, $F_{total}$ before and after aging are as follows:

Before aging [Equation 1]

$$F_{total,0} = F_{1,0} - F_{2,0}$$
$$= k_1 x - k_2 x$$
$$= (k_1 - k_2)x$$

[Equation 2]—After Aging $$F_{total,\infty} = F_{1,\infty} - F_{2,\infty}$$
$$= k_1 \alpha(x-d) - k_2 \beta(x+d)$$

In order to make the two loads equal to each other regardless of aging, the following equation should be established:

$$F_{total,0} = F_{total,\infty} \Rightarrow (k_1-k_2)x = k_1\alpha(x-d) - k_2\beta(x+d)$$

In order to further simplify the equation just above, let $k_1 = Ak_2$, $\alpha = B\beta$ (A, B>1), the following result can be obtained:

$$(Ak_2 - k_2)x = Ak_2 B\beta(x-d) - k_2\beta(x+d)$$
$$(A-1)x = ((AB-1)x - (AB+1)d)\beta$$
$$\beta = \frac{(1-A)x}{(AB+1)d + (1-AB)x}$$

Therefore, as the deterioration coefficients β can be obtained through combination of A, B, x and d, it is possible to make $F_{total,0} = F_{total,\infty}$ by setting α and β.

As described above, the noise reduction apparatus for the electric power steering system according to the aspect of the present disclosure makes it possible to maintain load applying to the support bearing even after aging by appropriately setting deterioration coefficients of the plurality of elastic members, thereby reducing rattle noise even after aging.

Figure 6:
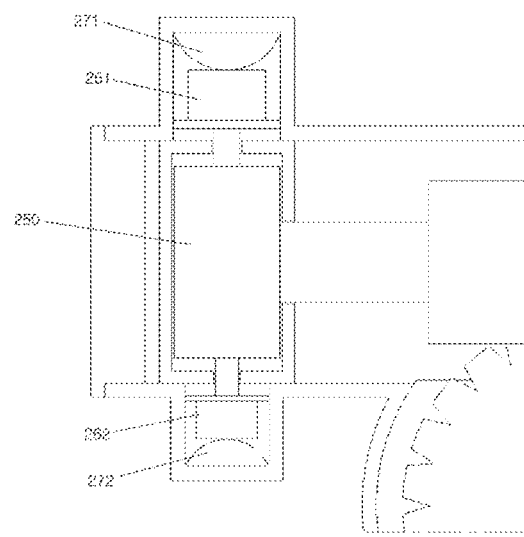
FIG. 6 is a schematic diagram of a noise reduction apparatus for an electric power steering system according to another aspect of the present disclosure.

Next, FIG. 6 is a schematic diagram of a noise reduction apparatus for an electric power steering system according to another aspect of the present disclosure. As shown in FIG. 6, elastic members 271 and 272 for elastically supporting a first pressing pin 261 and a second pressing pin 262 for applying load to a support bearing 250 may be any other elastic members such as rubbers or air cylinders that can impart elastic force to the pressing pins.

The noise reduction apparatus for an electric power steering system according to aspects of the present disclosure makes it possible to maintain load of the worm gear shaft even during long term use, thereby maintaining noise reduction effect even if parts of the power steering system deteriorate.

Nevertheless, it is possible to constitute a noise reduction apparatus as described herein while reducing or minimizing structural change of the existing noise reduction apparatus.

Although the present disclosure has been described in the foregoing with reference to the drawings illustrated by way of example, the present disclosure is not limited to the disclosed aspects, and it will be apparent to those of ordinary skill in the art that various modifications and variations can be made to the present disclosure without departing from the spirit and scope of the disclosure. Therefore, such modifications or variations fall within the scope of the present disclosure as claimed and the scope of the present disclosure should be interpreted based on the appended claims.

What is claimed is:

1. A noise reduction apparatus for an electric power steering system having a steering wheel and an electric motor, the noise reduction apparatus comprising:
   a worm wheel rotatably and integrally coupled to a steering shaft connected to the steering wheel;
   a worm gear shaft configured to be rotatably operated by rotational force of the electric motor and formed with a worm gear to be meshed with the worm wheel;
   a tilt bearing provided between the worm gear shaft and the electric motor to rotatably support one end of the worm gear shaft;
   a support bearing for rotatably supporting the other end of the worm gear shaft;
   a plurality of pressing pins for pressing the support bearing; and
   a plurality of elastic members for elastically supporting the plurality of pressing pins respectively;
   wherein the plurality of pressing pins comprises a first pressing pin and a second pressing pin and wherein directions in which the first pressing pin and the second pressing pin press the support bearing are opposite to each other.

2. The noise reduction apparatus according to claim 1, wherein the support bearing is provided in a cylindrical shape and wherein the noise reduction apparatus further comprises an elliptical ring for accommodating the support bearing, the support bearing being actuated to ascend or descend in the elliptical ring.

3. The noise reduction apparatus according to claim 2, wherein the support bearing comprises a top face and a bottom face, and wherein the first pressing pin is configured to penetrate the elliptical ring to press the top face of the support bearing and the second pressing pin is configured to penetrate the elliptical ring to press the bottom face of the support bearing.

4. The noise reduction apparatus according to claim 3, further comprising a housing in which the worm gear shaft, the elliptical ring, the first pressing pin and the second pressing pin are accommodated,
   wherein one ends of first and second elastic members are coupled to an inner surface of the housing and the other ends of the first and second elastic members are coupled to the first and second pressing pins respectively.

5. The noise reduction apparatus according to claim 1, wherein the plurality of elastic members comprises a first elastic member and a second elastic member, the first elastic member supporting the first pressing pin, and the second elastic member supporting the second pressing pin, the first elastic member and second elastic member having a predetermined deterioration degree relationship with each other.

* * * * *